United States Patent [19]

McKnight

[11] Patent Number: 4,563,336

[45] Date of Patent: Jan. 7, 1986

[54] REACTION CHAMBER ASSEMBLY

[76] Inventor: Robert C. McKnight, 1404 Neptune Ave., Leucadia, Calif. 92024

[21] Appl. No.: 586,433

[22] Filed: Mar. 5, 1984

[51] Int. Cl.[4] ............................ B01J 19/02; B01L 3/00
[52] U.S. Cl. .................................... 422/240; 215/276; 220/319; 374/38; 422/102; 422/103
[58] Field of Search ............... 422/102, 103, 240, 241, 422/242, 130, 52; 215/273, 276; 220/315, 319; 374/38, 31, 33, 34; 403/34, 40

[56] References Cited

U.S. PATENT DOCUMENTS 3,484,077 12/1969 Porter .................................. 422/103
4,013,419 3/1977 Betzer et al. .......................... 374/38
4,395,382 7/1983 Miskinis .............................. 422/103

Primary Examiner—Barry S. Richman
Assistant Examiner—C. M. Delahunty
Attorney, Agent, or Firm—Brown & Martin

[57] ABSTRACT

A reaction chamber assembly comprises a tapered pin having a radial chamber in which chemical or digestive reactions are to be carried out, and a collar member having a tapered bore of a taper size corresponding to that of the pin member. A closure mechanism is provided for urging the pin member into the bore so that there is a sealing engagement between the tapered surfaces of the members which acts to seal the chamber. The collar member may have a reinforcing sleeve fitted around it.

16 Claims, 5 Drawing Figures

REACTION CHAMBER ASSEMBLY

BACKGROUND OF THE INVENTION

1. Field of the Invention

The present invention relates to a reaction chamber in which chemical reactions can be carried out or in which specimens or samples can be treated with strong acids or bases to digest or dissolve them so that they can be analyzed. In the latter case, the reaction chamber assembly functions as a so-called "digestion chamber" for the treatment of biological and other types of specimens to be analyzed.

2. Prior Art

Chambers for carrying out chemical and bio-chemical reactions must normally be sealed to prevent loss of any products of the reactions, and the materials from which such chambers are made must be inert relative to the reaction taking place. Reaction chambers commonly comprise stoppered glass, metal, ceramic or plastics material, flasks or bottles.

The strong acids and bases used in the digestion of specimens so that they can be analyzed are highly corrosive and thus most of the normal reaction chamber materials cannot be used for this purpose. The materials used must also be inert to the bio-chemical products of the digestion. The most non-reactive materials known for digestion chambers are Teflon (Registered Trademark) and polyvinyl chloride (PVC). These are both amorphous, or cold flow materials. Digestion chambers comprising bottles made from Teflon (Registered Trademark) with screw caps are known. However, these have a very limited lifetime because of the amorphous nature of the materials. When the cap is screwed on, the screw threads distort and it will be difficult to obtain a good seal. After several uses, the seal will no longer be effective. Thus these flasks, although made from a relatively expensive material, have a very short useful lifetime.

SUMMARY OF THE INVENTION

The present invention provides a reaction chamber assembly which is generally useful for carrying out a wide variety of chemical reactions, but is particularly useful as a digestion chamber for digestion of specimens with strong acids or bases.

According to the present invention a reaction chamber assembly comprises a tapered pin member having at least one open radial chamber at an intermediate point in its length, a collar member having a tapered bore corresponding in taper size to the taper size of the pin member, and a closure mechanism for urging the pin member into the bore such that there is a sealing engagement between the tapered surfaces which acts to seal the radial chamber.

The radial chamber is suitably tear-drop shaped so that products which condense on the surface of the chamber will flow back into the mixture in solution in the chamber.

In use, compounds to be reacted together or specimens together with acids or bases to dissolve or digest them are first placed in the chamber. The pin member is then inserted into the bore, and the closure mechanism is used to force the tapered surfaces together so that the chamber is sealed. After the reaction or digestion is completed, the pin member can be removed for further analysis of the contents of the chamber.

In a preferred embodiment of the invention the pin and collar members are each made of an amorphous material which is relatively non-reactive or inert to the chemicals and bio-chemicals normally encountered in digestion of specimens. Because of the tapered design, the amorphous or cold flow characteristics of the materials aid in the sealing process, since the tapered surfaces will distort to produce an even closer seal.

According to a preferred feature of the invention, the collar member is surrounded by a metal reinforcing sleeve which limits or reduces expansion of the collar member on heating. By providing a reinforcing band, the collar member itself can be made with a greatly reduced thickness since it does not have to absorb the effects of expansion. This saves on material used and reduces the overall cost of the assembly significantly.

The closure mechanism may, for example, comprise a locking extension at one end of the pin member which projects out of the collar member when the pin member is inserted in the bore, and a member adapted for locking engagement with the extension. In a preferred embodiment, the extension is threaded and projects from the smaller diameter end of the locking pin, and a correspondingly threaded locking nut is provided for engagement with the extension to seal the pin member in the bore. When the nut is tightened on the threaded extension against the collar member, it tends to pull the pin member further into the collar, forcing the tapered surfaces against each other to provide a good seal. Where the pin and collar members are of an amorphous material, this action will cause distortion of the tapered surfaces to provide an even closer seal.

To release the pin member from the collar member, the locking nut is loosened and the seal is released, for example, by tapping the pin member with a hammer. Preferably, the pin member is dimensioned so as to project slightly out of the collar member at its larger diameter end, to aid in the release process. Alternatively, an unlocking or release mechanism may be provided for positive release of the seal. This may, for example, comprise a further threaded extension at the opposite end of the locking pin and a correspondingly threaded unlocking nut for engaging the extension such that rotation of the unlocking nut against the collar member tends to unseal the members by pulling the pin member out of the collar.

The pin and collar members are preferably of an amorphous material which is relatively inert to chemicals and bio-chemicals, such as Teflon (Registered Trademark) or polyvinyl chloride (PVC). Both members may be of Teflon or of PVC, or one may be of PVC and the other of Teflon. Where the pin member has threaded extensions for engagement with locking and unlocking nuts, the nuts may be of the same material as the pin member or of any other suitable material. Where a metal reinforcing sleeve is provided, it may be of aluminum, brass, stainless steel or other suitable material.

Thus the sealed chamber assembly of this invention has several advantages over the prior art stoppered flask-type reaction chambers, particularly since the prior art designs are not suitable for the commonly used inert or non-reactive materials.

It is, therefore, an object of this invention to provide a reaction chamber assembly which can be used for carrying out chemical reactions or for digesting or dissolving specimens in strong acids or bases prior to chemical analysis.

It is another object of this invention to provide a reaction chamber assembly which can have parts made from an amorphous, or cold-flow material and still provide a good seal over repeated uses.

It is a further object of this invention to provide a reaction chamber assembly which is relatively easy to manufacture and which is fairly inexpensive.

Yet another object of the invention is to provide a reaction chamber assembly which has a long lifetime even when the sealing parts of the assembly are made from amorphous materials which are relatively inert to the chemicals and bio-chemicals normally encountered in digestion of specimens for analysis.

BRIEF DESCRIPTION OF THE DRAWINGS

The following is a brief description of the accompanying drawings, which show some preferred embodiments of the present invention.

DETAILED DESCRIPTION OF THE DRAWINGS

Figure 1:
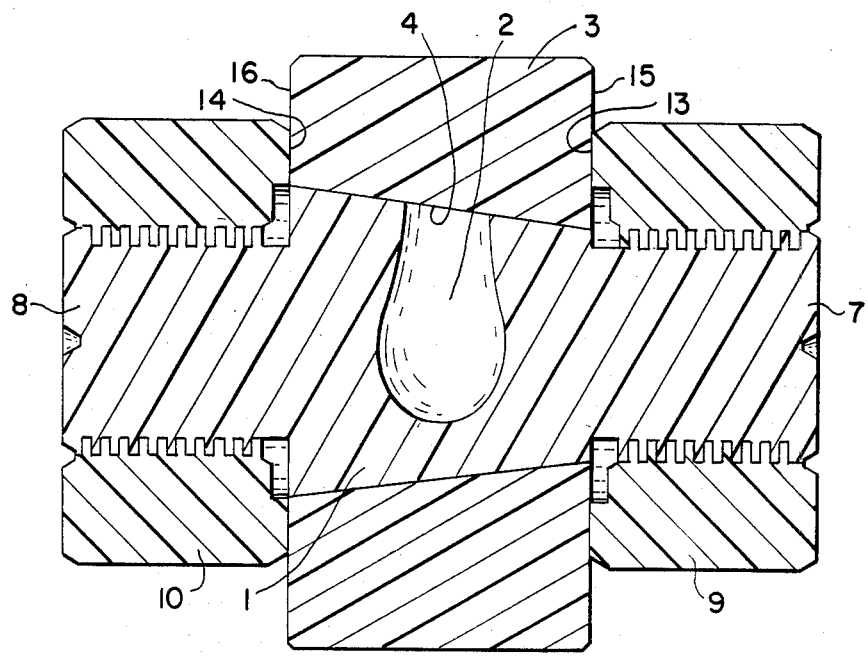
FIG. 1 is a vertical cross-section through a sealed reaction chamber assembly according to the invention.
Figure 2:
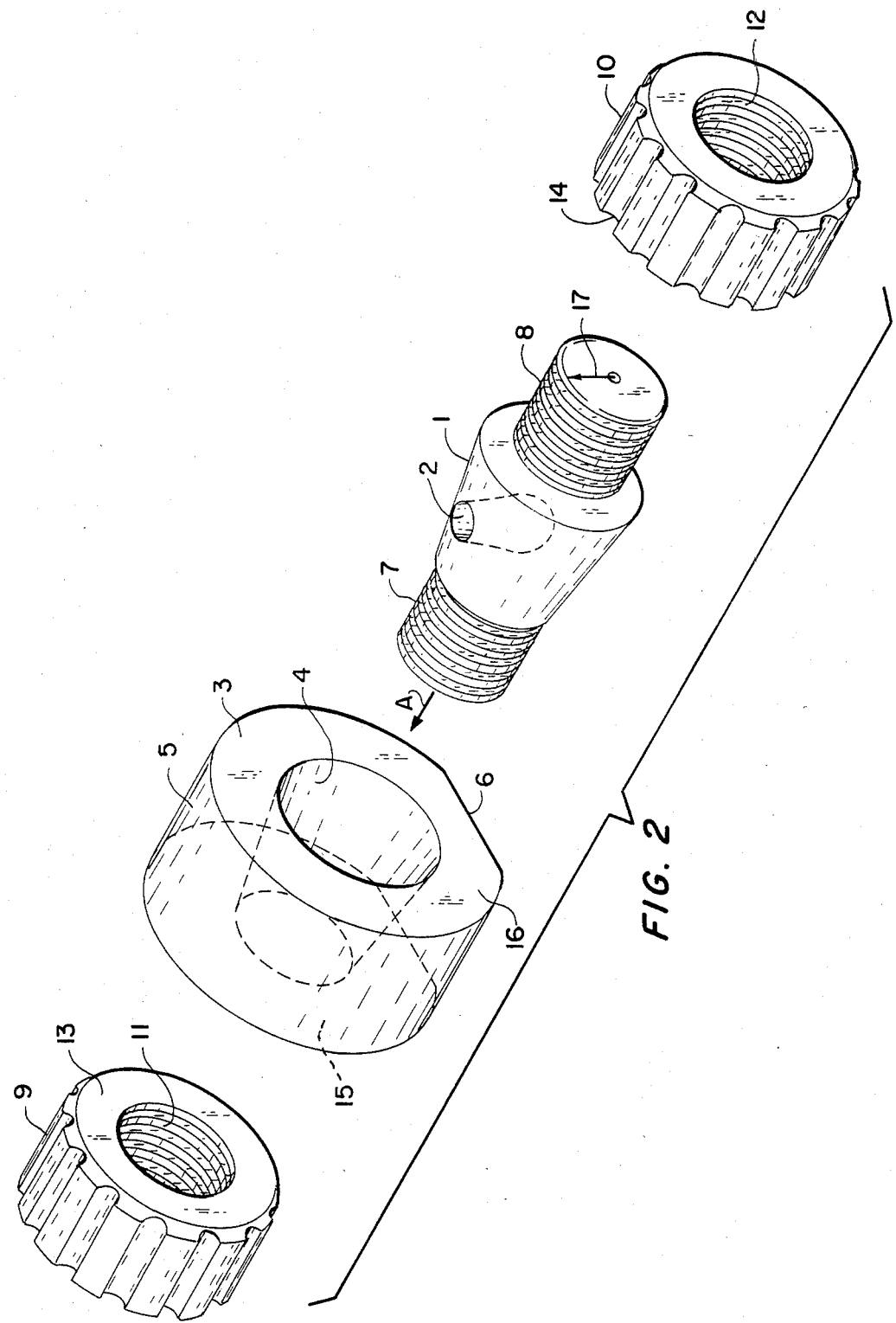
FIG. 2 is a perspective view showing the various separate parts of the assembly of FIG. 1.

FIGS. 1 and 2 show a first embodiment of a reaction or digestion chamber assembly according to the present invention in which chemical reactions between compounds or digestions of specimens with acids or bases can be carried out.

The assembly basically comprises a tapered pin member 1 having a radial surface with an open radial chamber 2, and a collar member 3 having a tapered inner bore 4 corresponding in taper to the taper of the pin member 1. The chamber 2 is suitably of tear-drop shape as shown so that condensation products will flow back into a solution in the chamber, but it may be of any desired size relative to the pin member and may be of any suitable reaction or digestion chamber shape. More than one chamber may be provided in a line along the length of the pin member 1 if desired.

The tapered surfaces of the pin member 1 and collar member 3 are preferably of about the same axial length, although one could be longer than the other. The taper or bevel of the bore 4 and the pin member 1 is preferably in the range of 15 to 1 to about 5 to 1. In a preferred embodiment a taper of about 10 to 1 was used. The tapered surfaces are preferably smooth but may have small ribs.

The collar member 3 has a cylindrical outer surface 5 with a flat face 6 for standing the collar member on a flat surface while a reaction or digestion is carried out in the chamber 2. The outer surface 5 may be of any shape, however, and may include a groove for supporting the pin member 1 with the opening of its chamber 2 pointing vertically upwards so that chemicals and/or specimens can be easily added to it.

The pin member 1 has threaded extensions 7, 8 extending from each end which project out of the collar member 3 when the pin member 1 is inserted in the bore 4 as shown in FIG. 1. A locking nut and an unlocking nut, 9 and 10, respectively having inner threads 11,12 corresponding to those on the extensions 7 and 8, respectively, are provided for engagement and release of the pin member 1 in the bore 4, as described in more detail below. The threads may be of any type but square or Acme threads as shown in the drawings are preferred since these are stronger than standard threads.

The locking and unlocking nuts 9,10 respectively each have inner faces 13,14 adapted to engage flat end faces 15,16, respectively, of the collar member 3 when assembled as shown in FIG. 1.

The materials chosen for the pin and collar members 1 and 3 will depend on the type of reactions to be carried out in the chamber 2. The materials must be chemically inert to the reaction taking place. Materials which are non-reactive to many chemical reactions are glass, ceramics, and some metals and plastic materials.

Preferably, some marking such as a spot or arrow 17 is provided on the exposed outer face of one of the extensions of the pin member 1, aligned with the opening of the reaction chamber 2 so that it can be seen whether or not the chamber is vertical.

Although the reaction chamber assembly can be used for a wide variety of reactions between compounds, the design is particularly effective when the chamber is to be used for the digestion of biological or other types of specimens for chemical analyses. Digestion chambers are used to dissolve specimens for a wide variety of analysis, for example in the analysis of blood, soils, and many other organic and inorganic materials. In some cases, the reaction or digestion chamber must be heated to complete the digestion of the sample, so the materials of the chamber assembly must be able to withstand and transmit heat.

The most desirable materials when the assembly is to be used for such digestions are Teflon (Registered Trademark) for polytetrafluoroethylene and polyvinyl chloride (PVC). These are both amorphous or cold flow materials which are relatively inert to bio-chemical reactions. Teflon will also transmit heat well if it is necessary to heat the digestion chamber. Because of their amorphous nature, these materials will distort when pressure is applied to them.

In one embodiment of the invention where the assembly is to be used for digestion of samples, both of the members 1 and 3 are of Teflon (Registered Trademark). Alternatively, one of the members may be of Teflon and other of PVC. This will produce some friction between the tapered surfaces. The nuts 9 and 10 may be of Teflon (Registered Trademark) or any other suitable material.

In use, specimens and the acids or bases to dissolve them, or compounds to be reacted together are first placed in the chamber 2. The pin member 1 is then inserted into the bore 4 in the direction A shown in FIG. 2, with the chamber 2 vertically oriented. The locking nut 9 is then rotated on the threaded extension 7 projecting from the smaller diameter end of the pin member 1. When the nut 9 is rotated against the adjacent flat surface 15 of the collar member 3, the pin member 1 will be pulled further into the bore 4. Thus the locking nut 9 co-operating with the threaded extension 7 acts as a closure mechanism for urging the tapered surfaces of the pin member and bore into sealing engagement. The nut 10 is then rotated on the threaded extension 8 projecting from the other end of the pin member.

If the materials used for the pin member 1 and collar member 3 are amorphous, as described above, the tapered surfaces will tend to distort when the pin member 1 is forced into the bore 4. This provides an even closer seal between the surfaces and thus a better seal of chamber 2.

When the reaction or digestion is complete, the seal can be broken by loosening the nut 9 and then rotating the nut 10 against the adjacent surface 16 of the collar member 3. This acts as a release mechanism to force the collar member 3 to separate from the pin member 1 and thus to release the locking engagement. It is not essential to provide a positive release mechanism as shown. The pin member may be released by simply applying force to its smaller diameter end, for example by tapping it with a hammer. Thus in this case only the closure mechanism, for example a nut 9 engaging on the threaded extension 7, need be provided on the pin member 1.

Figure 3:
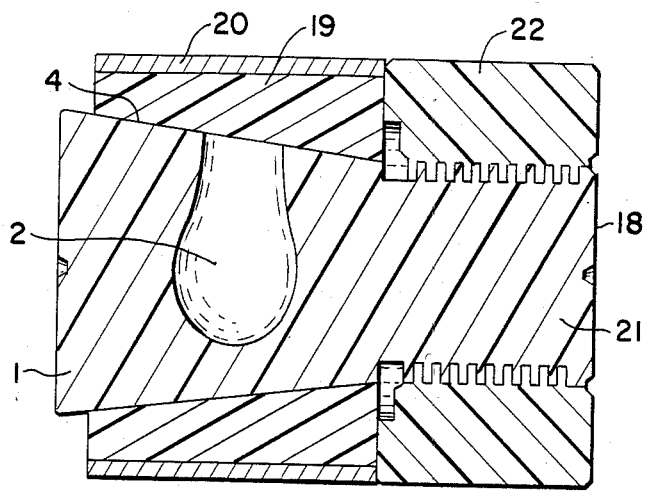
FIG. 3 is a vertical cross-section through a second embodiment of the reaction chamber assembly according to the invention.
Figure 4:
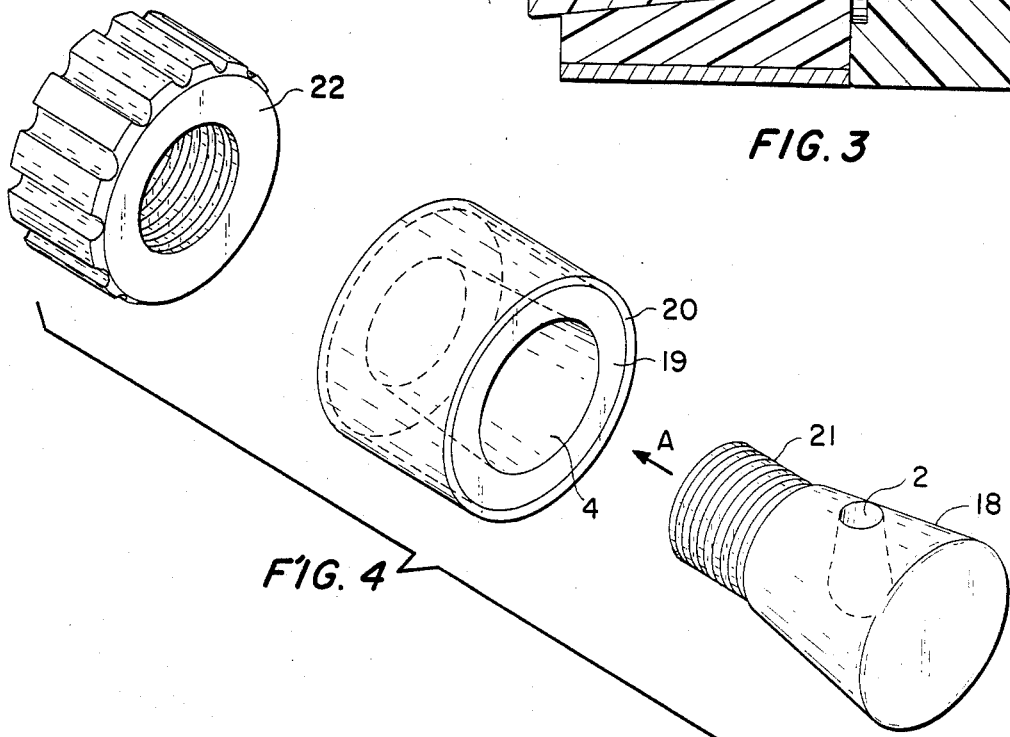
FIG. 4 is a perspective view showing the various separate parts of the assembly of FIG. 3.

FIGS. 3 and 4 show a second embodiment of the invention in which the amount of material used is substantially reduced.

The reaction or digestion chamber assembly shown in FIGS. 3 and 4 is similar to that shown in FIGS. 1 and 2 and equivalent reference materials have been used where appropriate. The assembly comprises cooperating tapered pin and collar members 18 and 19, respectively. Collar member 19 has a tapered inner bore 4 corresponding to the taper of pin member 18. Pin member 18 has a tear-shaped radial chamber 2.

The collar member 19 is of much reduced thickness relative to the collar member 3 of FIGS. 1 and 2, and is provided with a metal reinforcing sleeve 20 which is a close fit around the collar to reduce the limit expansion of the assembly on heating. Also, the pin member 18 has a threaded extension 21 only from its smaller diameter end. Its tapered portion is arranged to project slightly out of the collar member at its larger diameter end, as shown in FIG. 1. A locking nut 22 is provided for engaging with threaded extension 21 to seal the pin member in bore 4 of the collar member 19, as in the first embodiment.

The construction of FIGS. 3 and 4 allows for significant savings in material used for the collar member, pin member, and locking nut 22. This is important when relatively expensive materials such as Teflon are used in making these parts. As in the first embodiment, the most desirable materials for the pin and collar members and locking nut are amorphous materials such as Teflon (Registered Trademark) and PVC. The reinforcing sleeve may be of aluminum, brass, stainless steel, or equivalent materials, and sleeves may be formed by cutting sections from a tube of suitable diameter to fit around collar members. As mentioned above, the collar member 19 of this embodiment is relatively thin, and may be of the order of $\frac{3}{8}''$ ($9.525 \times 10^{-3}$ m) thick. The reinforcing sleeve is about half the thickness of the collar member and may be of the order of 3/16'' ($4.76 \times 10^{-3}$ m) thick.

The material used for the pin member is also less than in the first embodiment, since it has a threaded extension at one end only. The pin member 18 is released from bore 4 by releasing nut 22 and tapping or hammering the end of extension 21.

The locking nut 22 is also much smaller than in the first embodiment, since its diameter is equal to that of the collar member 19 and sleeve 20 which are of much less diameter than that of collar member 3.

The design of the assemblies described above avoids the problem of previous digestion chambers comprising bottles with screw on caps made from materials such as Teflon (Registered Trademark). These relied on a screw threaded engagement to provide the seal. In the present embodiment even if the screw threads distort an effective seal will still be produced, since the seal is provided between the tapered surfaces and not by the screw threads.

Figure 5:
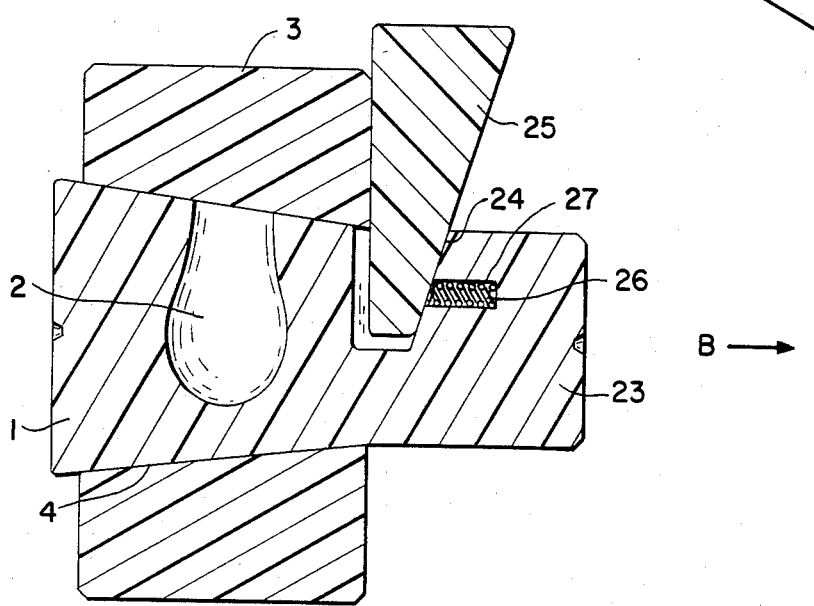
FIG. 5 is a view similar to FIGS. 1 and 3 showing an alternative closure mechanism for the assembly.

The closure mechanism need not comprise a screw-threaded engagement between the nut 9, 22 and extension 7, 21 as shown in FIGS. 1 and 3. Any mechanism for pushing or drawing the pin member 1 into the bore 4 may be provided. One alternative closure mechanism is shown in FIG. 5. In this case an extension 23 from the smaller end of the pin member 1 is provided with a tapered transverse slot 24. A wedge member 25 is urged into the slot 24 to draw the pin member 1 into the bore 4. A spring 26 located in an axial bore 27 in the extension 23 acts against the wedge member 25 to urge the pin member 1 in direction B. Clearly many alternative closure mechanisms are possible.

Some type of automatic closure mechanism may be provided instead of the manual devices described above. The larger end of the pin member may be clamped and then pushed automatically into a held collar member, and pulled out of the collar member once the digestion or reaction is complete. In an automatic process, a series of pin members may be pushed into collar members in sequence in this way, so that a series of reactions or digestions can be carried out.

The assemblies may be stood on end for storage or during a digestion or reaction process, since the shape of chamber 2 or 20 ensures that material will not be lost. The reaction chamber assembly described above can be used to provide a digestion chamber which has a relatively long life. They each provide a simple, well-sealed chamber for carrying out chemical or digestive reactions, with suitable choice of the materials for the chamber according to the reactions to be carried out.

The reaction chamber assemblies described above also provide a reliably sealed chamber for carrying out digestions or reactions, and the seal will be good over repeated uses of the chamber even when the assembly is made from an amorphous material such as Teflon (Registered Trademark). Thus the assembly has a relatively long lifetime, is fairly inexpensive, particularly in the second embodiment, and is easy to use.

As discussed above, an automatic process for carrying out a series of reactions could be provided, by carrying a series of pin members on supports, adding samples to be reacted to their chambers in sequence, pushing them into collar members and releasing them once the desired reactions have taken place.

It will be clear that modifications can be made to the disclosed embodiments without departing from the scope of the invention. The invention is therefore not limited to the disclosed embodiments but is defined by the appended claims.

What is claimed is:

1. A reaction chamber assembly comprising: a pin member having tapered portion along at least part of its length and having a radial surface portion extending along said tapered portion, said pin member having at least one chamber in its tapered portion, said at least one chamber having a single opening therein, said opening being located on the radial surface of the tapered portion of said pin member; a collar member having a through bore which is tapered along its length, the bore taper corresponding to the tapered portion of the pin member; and a closure mechanism urging said tapered portion of the pin member into said bore such that there is a sealing engagement between the radial surface portion of said tapered portion and said collar member to seal said opening of said at least one chamber.

2. The assembly of claim 1, wherein said chamber is substantially tear-drop shaped.

3. A reaction chamber comprising: a tapered pin member having a larger diameter end and a smaller diameter end, a radial surface portion extending between said ends and having at least one chamber for containing reactants within said pin member, wherein said at least one chamber has a single opening, said opening being located on the radial surface of said pin member at an intermediate point along the length of said pin member; a collar member having a tapered inner bore corresponding in taper to the taper of said pin member; and a closure mechanism urging said pin member into said bore such that there is a sealing engagement between the radial surface of said pin member and the inner bore of said collar member to seal said opening of said at least one chamber.

4. The assembly of claim 3, wherein the taper of said tapered surfaces is substantially in the range of from 15 to 1 to 5 to 1.

5. The assembly of claim 3, wherein said collar member has a reinforcing sleeve of substantially rigid material fitted around it.

6. The assembly of claim 5, wherein said sleeve is of metallic material.

7. The assembly of claim 3, wherein said chamber is a digestion chamber and said members are each made from a material which is amorphous and non-reactive to the digestion process.

8. The assembly of claim 7, wherein said members are of plastics material.

9. The assembly of claim 7, wherein each member is of polytetrafluoroethylene synthetic resin.

10. The assembly of claim 7, wherein each member is of polyvinyl chloride (PVC).

11. The assembly of claim 7, wherein one of said members is of polytetrafluoroethylene synthetic resin and the other is of polyvinyl chloride (PVC).

12. The assembly of claim 3, wherein said closure mechanism includes a first extension at the smaller diameter end of said pin member adapted to project out of said collar member when said pin member is engaged in said bore, and locking means for providing a locking engagement between said extension and said collar member.

13. The assembly of claim 12, wherein said first extension is threaded and said locking means comprises a correspondingly threaded locking nut, said threaded first extension projecting from the smaller diameter end of said pin member such that tightening of said nut tends to force said pin member further into said bore in a direction increasing said sealing engagement.

14. The assembly of claim 12, further comprising an unlocking mechanism including a second extension at the larger diameter end of said pin member adapted to project out of said collar member when said pin member is engaged in said bore and unlocking means for disengaging the collar member and the pin member, wherein said first and second extensions are threaded and wherein said locking and unlocking means are threaded nuts adapted to engage said first and second extensions, respectively.

15. The assembly of claim 14 wherein said chamber is a digestion chamber and said pin member, collar member, and locking nut and unlocking nut are all each from an amorphous material, which is relatively non-reactive to digestion processes.

16. The assembly of claim 14, wherein the taper is 10 to 1.

* * * * *